United States Patent
Tranmer

Patent Number: 5,407,014
Date of Patent: Apr. 18, 1995

[54] GRAVEL SCARIFYING DEVICE

[76] Inventor: Graham Tranmer, 4357 Exeter Road, Unit "B", London PO, Westminster, Ontario, Canada

[21] Appl. No.: 37,846

[22] Filed: Mar. 23, 1993

[51] Int. Cl.$^6$ ............................................. A01B 49/02
[52] U.S. Cl. .................................. 172/197; 172/684.5; 172/140; 172/198; 172/200; 172/753; 172/762
[58] Field of Search ................ 172/195–200, 172/785, 799.5, 140, 315, 316, 445.1, 446, 664, 684.5, 691, 694, 753, 762, 763, 741, 743

[56] References Cited

U.S. PATENT DOCUMENTS

| | | | |
|---|---|---|---|
| 2,840,933 | 7/1958 | Brem | 172/197 |
| 3,430,703 | 3/1969 | Richey. | |
| 3,470,964 | 10/1969 | West et al. | |
| 3,834,465 | 9/1974 | Collins | 172/197 |
| 3,999,315 | 12/1976 | Nye | 172/743 |
| 4,217,962 | 8/1980 | Schaefer | 172/197 |
| 4,553,608 | 11/1985 | Miskin | 172/197 |
| 4,924,945 | 5/1990 | Mork | 172/197 |
| 5,265,975 | 11/1993 | Scott | 172/197 |

Primary Examiner—Randolph A. Reese
Assistant Examiner—Spencer Warnick
Attorney, Agent, or Firm—James W. Kerr

[57] ABSTRACT

A scarifier/grader apparatus comprises, in combination, a tractor connected through a 3-point hitch to a scarifier/grader attachment wherein:

the tractor is adapted to be operably connected through a three point hitch to a scarifier/grader attachment comprising a scarifier including hydraulics for raising and lowering a plurality of scarifying teeth borne thereon in laterally pivotable relation on a bracket that is angled in a forward direction to improve the angle of attack;

a grading blade having a mold board and a cutting edge;

a second frame interconnecting the scarifier frame and the blade in mutually spaced apart relation with the scarifier in operably leading relation and the blade in operably trailing relation, wherein the scarifier includes height-adjusting hydraulics for selectively raising and lowering the plurality of scarifying teeth borne thereon relative to the cutting edge.

9 Claims, 6 Drawing Sheets

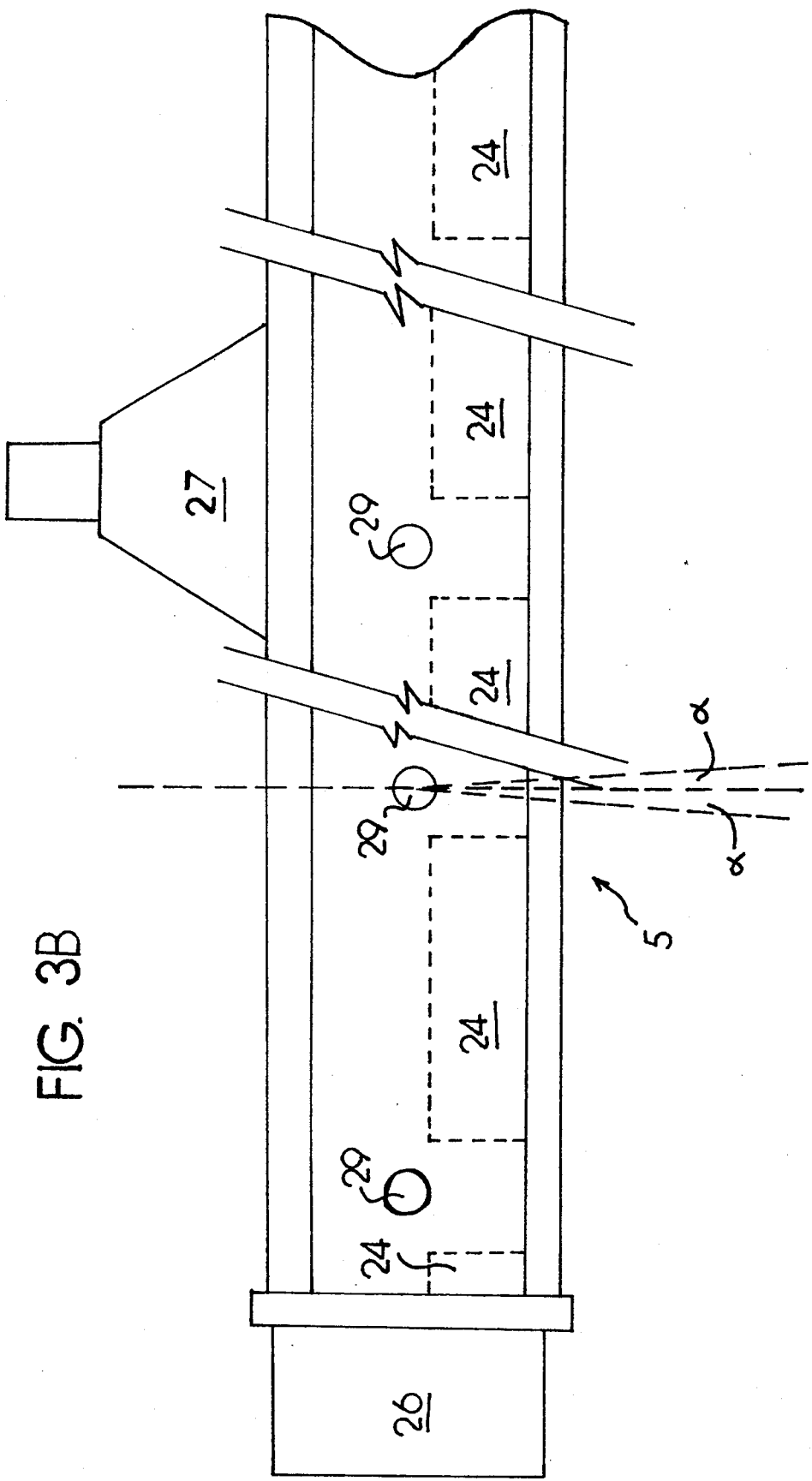

GRAVEL SCARIFYING DEVICE

FIELD OF THE INVENTION

The present invention relates to scarifier blade improvements in devices for scarifying and levelling gravel roadways, parking lots, and the like.

BACKGROUND OF THE INVENTION

Gravel roads, gravel shoulders, gravel parking lots, all exemplify the use of gravel in economically facilitating both vehicular and pedestrian traffic over defined areas and routes. For various reasons, the use of gravel in these applications can be very much more attractive than the alternatives afforded by asphalt and concrete paving.

The use of gravel, however, is not without its own complications. Uneven compaction over the travelled surface can lead to the formation of wheel ruts, while turning, accelerating or decelerating traffic can lead to local phenomenon such as potholes and corrugations; and, the aggregate material will itself tend to undergo a sorting, by particle size, attributable to differential compaction effects, the results of all of which are less than attractive. In some cases, these effects represent safety hazards.

One solution to the degradation of such gravel emplacements has been to simply add additional gravel over the surface, as needed. Interestingly, there is only a limited consolidation between the added material and the underlying surface, which tends to leave the upper, relatively unconsolidated material in an easily disturbed layer from which aggregate material tends to be rapidly displaced. Moreover, commercial sources of aggregate depend of naturally occurring gravel deposits, and like most natural resources, their numbers are becoming depleted. Although the existence of many more marginal deposits stave off any likelihood of critical shortages of supply, the costs of harvesting a more marginal deposit is inherently higher, and this is reflected in higher gravel costs.

As a consequence, the historical practice most often adopted to remediate gravel roads, parking lots and the like, have entailed the use of large, powerful road graders, equipped with scarifiers. A grader is, by definition, a machine with a centrally located blade that can be angled to either side. Typically, graders have a reinforced tubular or box-beam "Y" frame supporting the engine at the rear of the vehicle, between the arms of the "Y". Drive wheels, usually arranged in tandem, are positioned below the engine and transmission, while steering wheels are arranged on an axel system at the point of the "Y" frame. The major attachments for the grader are secured in downwardly hung relation from the overhead portions of the frame, and are pulled by a drawbar reaching back from the front of the frame. These attachments include the blade and the scarifier.

More specifically, the blade is arranged on a toothed ring gear called the "circle", on which the attachments can be rotated. An arm-type attachment between the "circle" and the frame allow the circle to be controllably lifted, lowered, offset to either side, or even to be placed into a vertical configuration. The scarifier is typically position in front of the blade, and is carried on a pair of arms that reach back from the front end of the graders frame. The scarifier can be raised and lowered to regulate the depth of penetration, relative to the bottom of the graders tires. The number of teeth used on the scarifier is dependent on the hardness of the surface being worked.

Attempts at smaller scale scarifiers have been unsuccessful from a performance point of view, and have not enjoyed commercial acceptance. One such attempt took the form of a towed "box scarifier". This consisted of a scarifier and a plough blade arranged at opposed ends of a frame which a had a box shaped plan. The device was dragged along by a vehicle with the intention that the scarifier would turn up the underlying aggregate and the plough blade would evenly redistribute it. Unfortunately the device was neither heavy enough to scarify properly, nor did it afford the control necessary to evenly redistribute even such material as was dislodged by the scarifier teeth. The problem is similar to that encountered with very early attempts to use towed road construction rippers, the use of which has now apparently been abandoned. Towed rippers too, proved to be unsatisfactory do to poor penetration. If sufficient weight was added to the towed ripper to insure effective penetration, the ripper became too heavy for any but the largest of commercial tractor vehicles. These towed rippers were also rather unwieldy, and hard to manoeuvre. Lastly, such rippers were not grading devices, and are simply a battery of teeth mounted on a wheeled vehicle.

Towed graders were also known. These were produced in an attempt to deal with a number of grader-related problems, but are now considered outmoded. Their use required two skilled operators, which was an offset to the presumed advantage of reduced capital and maintenance costs. They were in any case, found to be hard to manoeuvre even relative to motorized graders, and were never known to be used in scarifying operations. There is the further problem that the tow vehicle tends to compact the material that the towed grader was intended levelingly redistribute.

Accordingly, the only known commercially viable practice continues to rely on the use of motorized graders. Graders provide sufficient weight and power to force the scarifier teeth into the ground and drag it along, together with the control necessary to position a grader blade for proper redistribution of the dislodged materials.

The problems that are and have always been immediately apparent in connection with the use of graders for this purpose continue to be a problem, however. These include a requirement for a highly skilled operator. Moreover, graders are not highly manoeuvrable, a problem which is a function of the very size and weight heretofore thought necessary to achieve scarifying/-grading operations. Moreover, the economics of grader operation are very sensitive. For example, according to "HEAVY CONSTRUCTION—Equipment and Methods"—by Stuart Wood Jr., points out that straight line grading patterns that cover less than 1000 linear feet, are economically inefficient because of the operating/time costs associated with turning the grader around. Even were the economics otherwise, the large size of graders make them difficult or even impossible to manoeuvre in the manner necessary to service the close quarters that characterize many gravel emplacements. The travelling costs of grader equipment are very high, and some jobs are often not done at all particularly if they are in geographically isolated areas.

A solution to the difficulties facing this art is set out in detail in commonly-owned Canadian patent application 2,043,985 filed on Jun. 6, 1991, and a corresponding U.S. patent application Ser. No. 714,809, filed on Jun. 13, 1991. The device disclosed in these earlier filed patent applications is economical and versatile. Improvements in operating efficiency are, however, always desirable, and it is towards that end that the present improvements are directed.

SUMMARY OF THE INVENTION

In accordance with one aspect of the improvements according to the present invention, therefore, there is provided a scarifier comprising a plurality of supported, downwardly depending, axially secured scarifying teeth having substantial lateral free play at respective scarifying tip ends thereof. This scarifier includes a scrarifying-tooth supporting frame having bracket means adapted to engage respective shank portions of a downwardly depending plurality of scarifying teeth in axially secured relation with sufficient degrees of lateral freedom to provide lateral play to spaced apart scarifying points of respective ones of said teeth. More particularly, the improvement relates to teeth and bracket means which include interconnecting pivot pin means adapted to permit the teeth to rotate in a laterally extending plane, relative to the bracket. The teeth's rotation is restricted to within the limits of an arc of rotation set by pivot-arc-limiting blocks positioned, typically on the bracket, but in any case in mutually laterally spaced relation from respective ones of opposed sides of the shank portions.

The bracket means according to the above mentioned improvement preferably comprises a laterally extending, elongated, tooth pivot supporting bar for supporting ones of a plurality of tooth pivot pins, each adapted to engage corresponding ones of a plurality of teeth in rotatable relation about the pins. The pins engage the teeth through respective pivot holes extending through respective shank portions of each of the teeth. The bar supports a corresponding plurality of pairs of pivot-arc-limiting blocks arranged in mutually laterally spaced apart relation to either side of each of the pins, with the teeth being adapted to be positioned generally centrally between respective ones of the block pairs.

Preferably the blocks are operable to limit the degrees of arc through which the tooth is rotatable about the pivot pin, to about five degrees to either side from that generally central position.

In accordance with another aspect of the above improvement, a plurality of mutually longitudinally spaced apart holes are arranged in each of the teeth shanks. This facilitates adjustment of the spacing of the scarifying points from the pivot. This in turn allows the tooth to be repositioned to accommodate tooth wear, or if desired to facilitate greater or lesser amounts of side to side motion of the scarifier tip, as might be appropriate depending on the degree of campaction of the material being scarified.

In accordance with another improvement of the present invention, there is provided a scarifier/grading device comprising in combination:

a scarifier frame including means for generally vertically raising and lowering a plurality of scarifying teeth borne thereon;

a grading blade having a mold board and a cutting edge; and, a second frame interconnecting said scarifier frame and said blade in horizontally, mutually spaced apart relation with said scarifier in operably normally leading relation and said blade in operably normally trailing relation;

wherein said scarifier includes height-adjusting means for selectively raising and lowering a plurality of scarifying teeth borne thereon relative to said cutting edge, and, wherein the scarifying points of the teeth are arranged at a "forward" (ie away from the grading blade) attack angle relative to the scarifier frame.

It is preferred that the teeth be mounted on angled bracket means adapted to engage respective shank portions of a generally downwardly depending plurality of scarifying teeth, so that they are arranged at a forward attack angle relative to the frame. The angled bracket means thereby supports the teeth at a forwardly directed angle of between about 5 and 15 degrees from vertical, and preferably at about 10 degrees from vertical.

In an especially preferred embodiment according to the present invention, the plurality of supported, downwardly depending, axially secured scarifying teeth have substantial lateral free play at respective scarifying tip ends thereof. A combination of the first above mentioned improvement, and the forward angling of the teeth according to the last above mentioned improvement, are especially preferred.

DETAILED DESCRIPTION OF A PREFERRED EMBODIMENT

Introduction to the Drawings

Over the course of the detailed description which follows hereinbelow, reference will be made to the appended drawings, in which:

FIG. 3B is an elevated side view of an improved bracket according to the present invention, in exploded relation to scarifier teeth adapted for use therewith;

Figure 1:
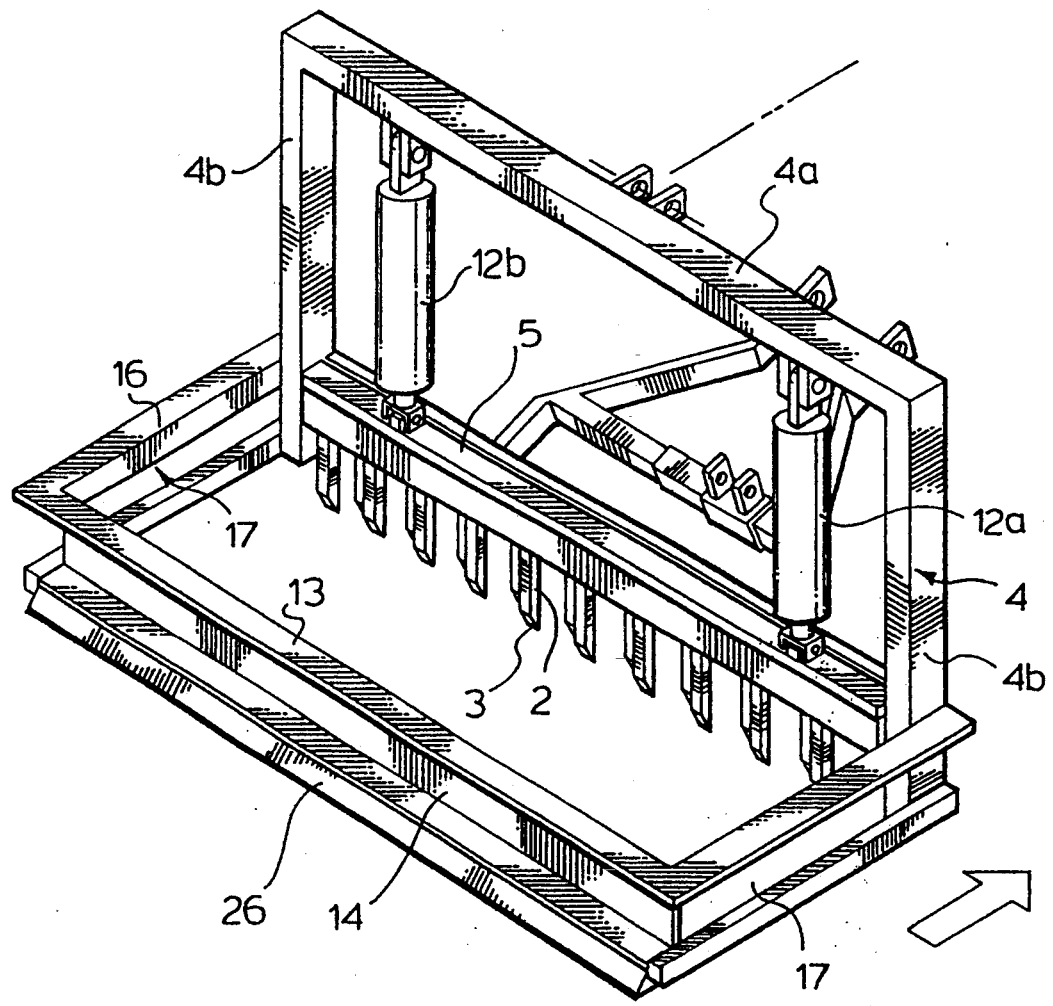
FIG. 1 is a perspective view of a preferred embodiment of the present invention, showing a combination scarifier/levelling blade attachment.

Referring now to FIG. 1 of the drawings, there is depicted a scarifier 1 comprising a plurality of teeth 2, including respective tips 3, supported by a supporting frame 4 which includes a bracket means 5. The scarifier 1 includes height adjusting means in the form of a pair of spaced apart hydraulic cylinders 12a and 12b which are operably connected between an overhanging horizontally extending member 4a, and bracket means 5 which is slidably arranged in vertically extending channels formed in vertically extending frame members 4b. The illustrated embodiment includes, in combination with scarifier 1, a blade 13 having a mold board 14 and a cutting blade 15. These are fixedly secured to scarifier 1 through a second frame 16 that is rigidly co-joined to supporting frame 4. Openings 17 in the sides of second frame 16 provide for the egress of excess scarified materials from in front of blade 13, so as to make the load manageable. Blade 13 also includes a trailing shoe 26 which can be usefully employed in free floating the blade during levelling operations, as will be apparent to persons skilled in the art in light of the present invention. In this frame arrangement, the scarifier 1 and the blade 13 are cooperable in a mutually dependent relation, that is distinguishable from the mutually independent operation of scarifiers and grading blades used on graders. One advantage of the present invention in this respect is the greater ease with which the scarifier and plough can be cooperatively oriented, particularly when the device is employed by a relatively unskilled operator. In addition, the present device can be readily connected in tandem with a compaction device, such as a roller, through a tow bar or tongue affixed to the rear of the device, to accomplish the complete surface conditioning task in a single pass, when conditions permit.

Figure 2:
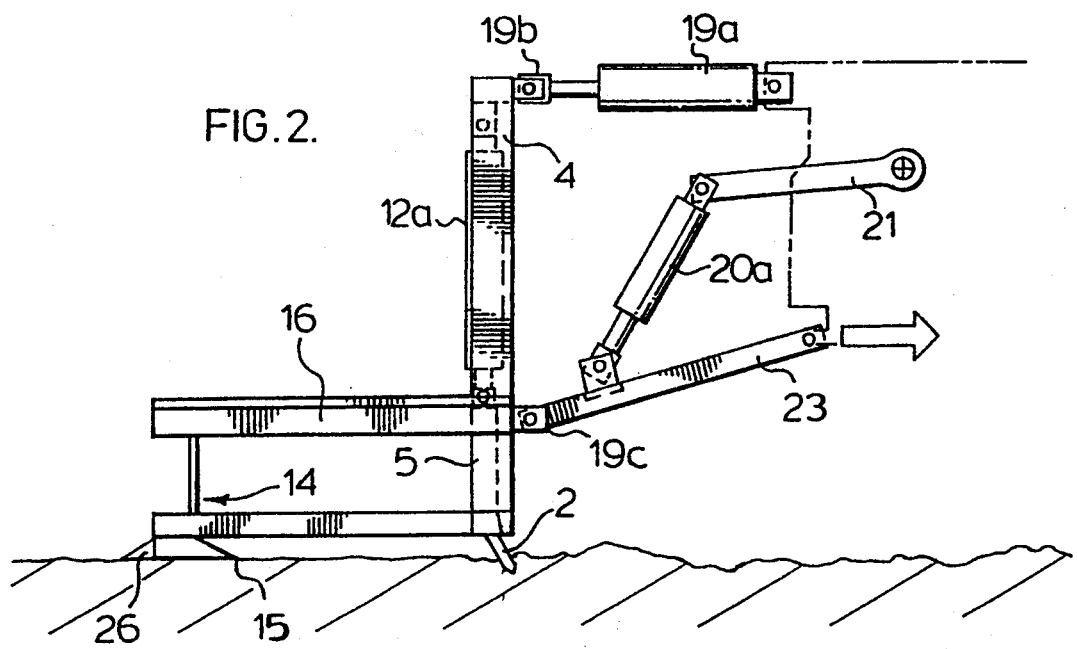
FIG. 2 is an elevated side view of the attachment illustrated in FIG. 1, shown in operative combination with a modified three point hitch, useful in combination with the present invention.

FIG. 2 of the drawings depicts the device according to FIG. 1, in an elevated cross sectional view which emphasises the three point hitch connections preferred herein, and depicts the forward angle of tooth 2. More specifically, there is illustrated a three point hitch and scarifier/blade attachment in interconnected relation. In accordance with this preferred practice, the vertical frame member 4a is interconnected through a pivot attachment point 19b, to a centre link hydraulic cylinder 19a. More particularly, it is preferred that connection point 19b include a bracket extending from frame member 4a, that includes holes adapted to receive a connection pin. The pin is adapted to co-join the cooperative terminus of cylinder 19a, through the bracket in question, to frame member 4a. In like manner, holes/pins are used intermediate connection points 19c, between the respective draught links 23 and corresponding ones of vertical frame members 4b.

Figure 3:
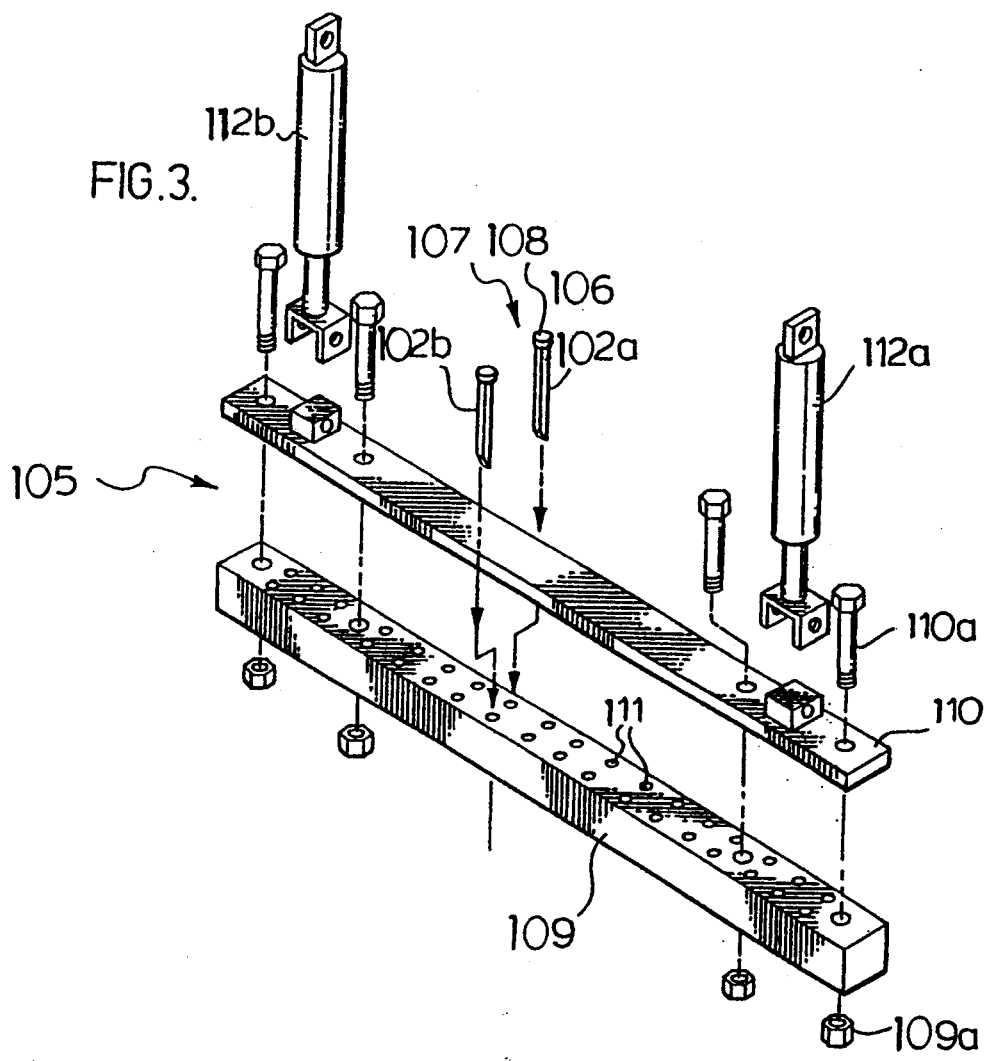
FIG. 3 is an exploded depiction of an exemplary bracket as disclosed in an earlier filed, commonly-owned patent application, which does not embody the features of the present invention.

Referring now to FIG. 3 there is illustrated one of the earlier forms of a bracket 105 is illustrated in an exploded perspective that reveals holes 111. While this bracket does not include the improvements according to the present invention, it is instructively illustrative of the type of bracket which is described in detail in co-owned Canadian patent application 2,043,985 filed on Jun. 6, 1991, and corresponding U.S. Patent application Ser. No. 714,809, filed on Jun. 13, 1991, (see FIGS. 3, 3a and 3b thereof). These holes 111 are arranged in an array that is adapted to receive respective ones of leading and trailing teeth 102a and 102b, and so as to provide a range of from about 1/16 to 3/32 of an inch clearance between the edges of holes 111 and the adjacent portions of the teeth shanks 106. A crown 108 provides axial interference means on teeth 102, that limit the axial passage of teeth 102 through corresponding ones of holes 111. Plate 110 is adapted to be received, with teeth 102 positioned in holes 111, in overlaying relation above plate 109. The two plates are bolted together with bolt 110a and nut 109a, to clampingly engage the axially interfering portions 108 of the teeth, between the two plates. It has been found that the "play" afforded to the teeth in this arrangement have a disadvantage in that the forward motion of the scarifer pulls the teeth into a negatively angled attack posture, that cannot the readily or conveniently counteracted through changes in the scarifiers attitude as a whole. This arrangement materially detracted form the scarifying efficacy of this arrangement.

As distinguished from the bracket illustrated in FIG. 3 hereof, the bracket illustrated in FIGS. 3a through 3d embodies the improvements according to the present invention. More particularly, the forward angling of the teeth in connection with these improvements, helps to preserve scarifing efficacy.

Figure 3A:
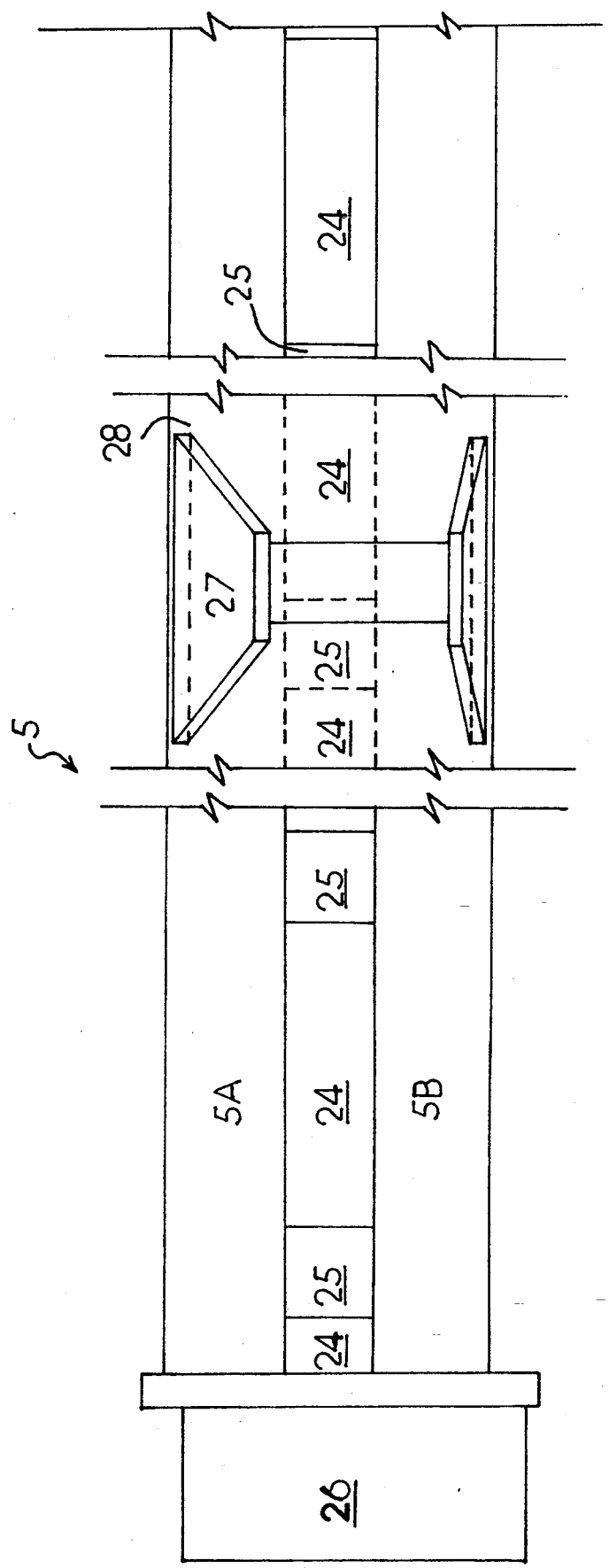
FIG. 3A is a top plan view of an improved bracket assembly for a scarifier according to the present invention.

FIG. 3a is a partially cut-away plan view of one end of an elongated bracket 5 comprising "c"-section rails 5a and 5b. These are adapted to engage respective shank portions of a downwardly depending plurality of scarifying teeth in axially secured relation with sufficient degrees of lateral freedom to provide lateral play to spaced apart scarifying points of respective ones of the teeth. The combination of the teeth 2 and bracket 5 include interconnecting pivot pin means, comprising a readily serviced bolt and cotter pin arrangement (not shown) which is adapted to permit the teeth to rotate in a laterally extending plane, relative to the bracket. The motion of the teeth is restricted to within the limits of an arc of rotation set by pivot-arc-limiting blocks 24 positioned along the length of the bracket in mutually laterally spaced relation, leaving oversized openings, 25, adapted to accommodate respective ones of opposed sides of the shank portions 6. Guide blocks 26 are arranged at either end of bracket 5, and are adapted to slide in engaged register with channels formed in vertically extending frame members 4b. Cylinder brackets 27 are arranged on a top plate 28 of bracket 5, and are adapted to be secured to cylinders 12a and 12b, as shown in FIG. 1.

FIG. 3B is an elevated side view of bracket 5 as illustrated in FIG. 3A. Blocks 24 are shown in phantom, behind rail 5b. Holes 29 are arranged to accommodate bolts, (not shown) for pivotally attaching teeth 2 to bracket 5, in the manner hereinbefore specified. As illustrated, the blocks are spaced about 15/16 inches apart to accommodate a 1⅛ inch wide tooth 5. The tooth is free to rotate through angle "alpha" of about five degrees to either side of centre (i.e. through an arc of about ten degrees in total), displacement of about ½ to 9/16 inches on either side of center, (ie a range of lateral displacement of about one inch), for a tooth that is about five inches long and pivoted through pivot hole 30b.

Figure 3C:
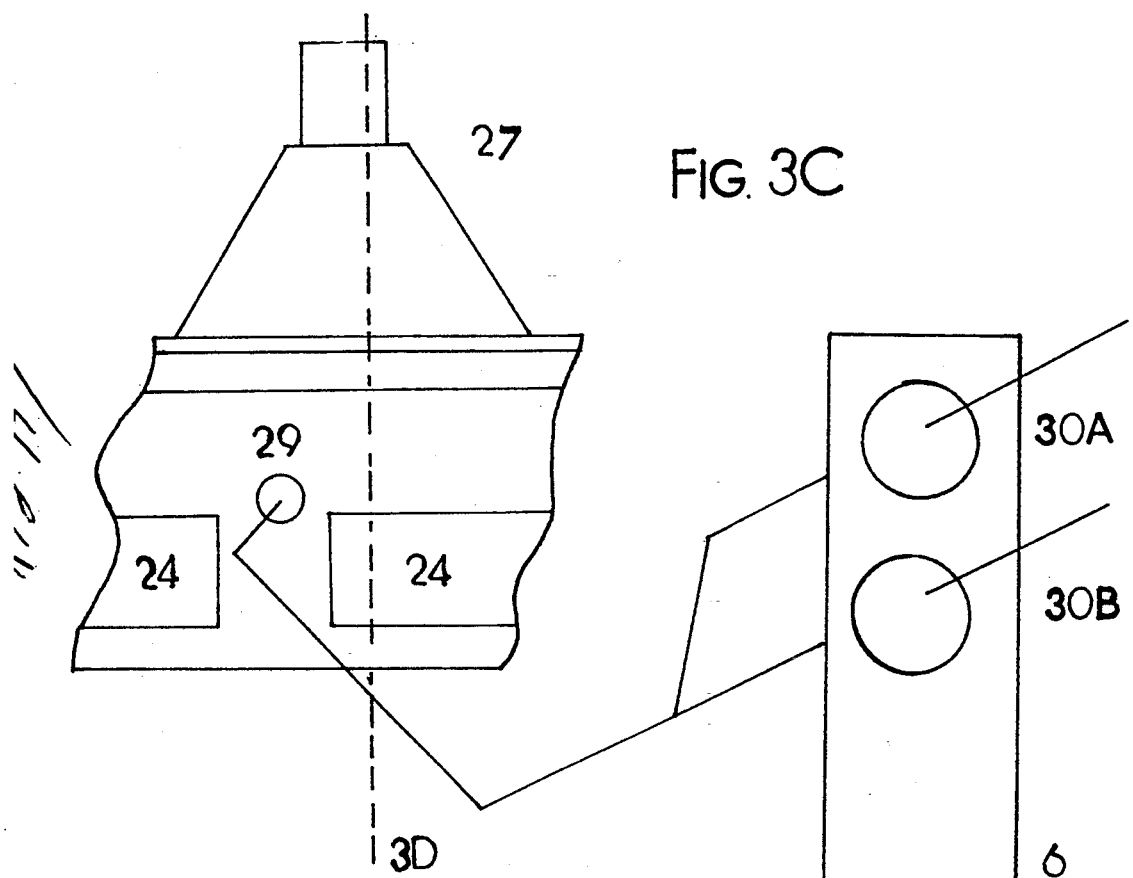
FIG. 3C is an exploded view of a portion of the improved bracket in the background, and an associated tooth in the foreground.

FIG. 3C illustrates in an exploded elevated side perspective, the registration of one of holes 29 with a selected one of tooth holes 30a or 30b. The spacing between holes 30a and 30b can be used to adjust the length of the point 3 from the pivot located through hole 29, thereby lenghthening the rotational radius and decreasing the amount of lateral displacement that the tooth 5 is free to move through. Moreover, the holes permit the tooth to be effectively lengthened, in order to compensate for normal tooth wear during use.

Figure 3D:
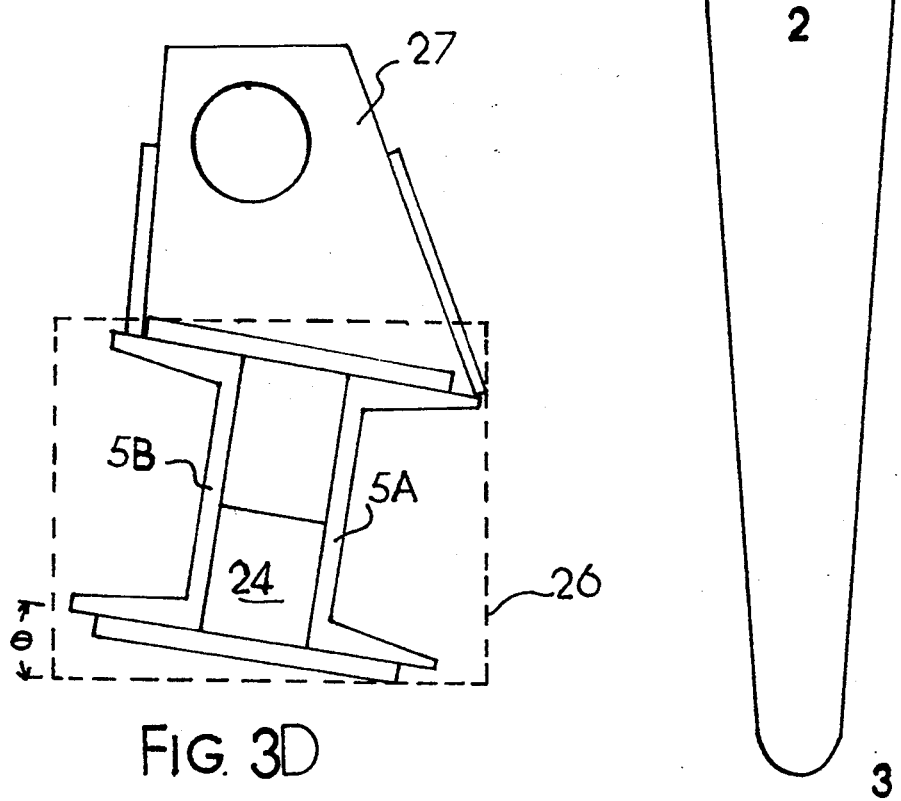
FIG. 3D is an elevated end view of the improved bracket according to the present invention.

FIG. 3D is a sectional view taken along line 3d in FIG. 3C. The forward angled orientation of supported teeth is facilitated through the tilted posture (theta is about 5 to 15, and preferably above 10 degrees) of rails 5a and 5b, relative to the fixed guides 26, (shown in phantom).

Figure 4:
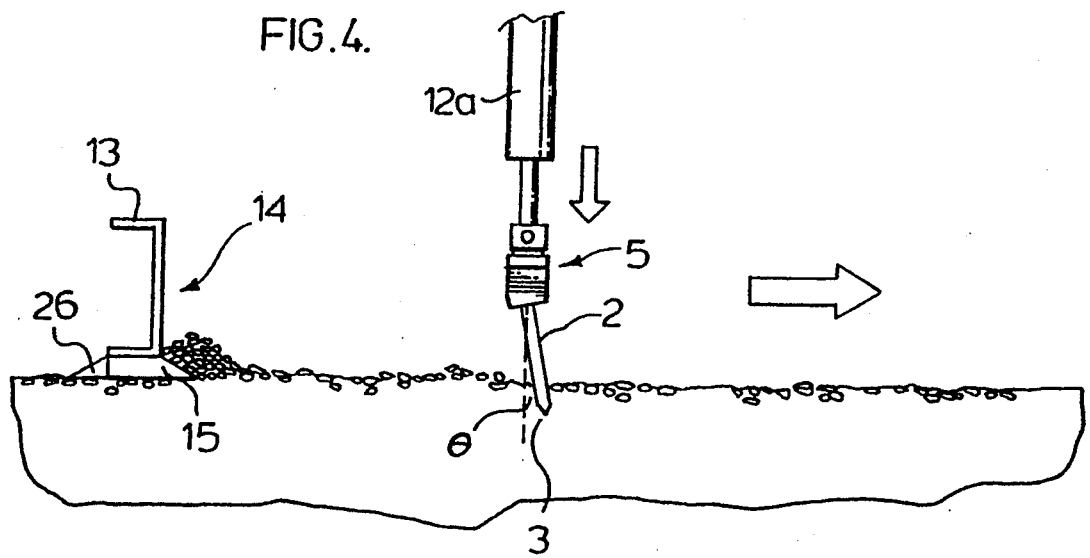
FIG. 4 is an elevated sectional, side view illustrating the combination of the scarifier and blade depicted in FIG. 1.

FIG. 4 of the drawings illustrates the cooperation of the scarifier and blade of the present invention. In particular, note the forward angling "theta" of the scarifier teeth 2. In the illustrated embodiment, "theta" is about 10 degrees. Subjective observation attaches as much as a twenty to thirty percent improvement in scarifying efficacy, owing to this forward angle orientation of scarifier teeth 2, when the combined device is operated in the forward direction, (as indicated by the large arrows shown in FIGS. 1 and 4 hereof). Although ranked arrays of teeth can be employed in conjunction with the present invention, it is believed that the increased efficacy in general, does away with any need for same. Note that the operation of cylinders 12a and 12b provide for height adjusting means, whereby the depth of the scarifier can be varied relative to the blade position. In attachments according to the present invention which are adapted to be secured in combination to other positioning apparatus, and whereby the blade and the scarifier are responsively co-positionable, there is provided the operational advantages already mentioned herein.

Figure 5:
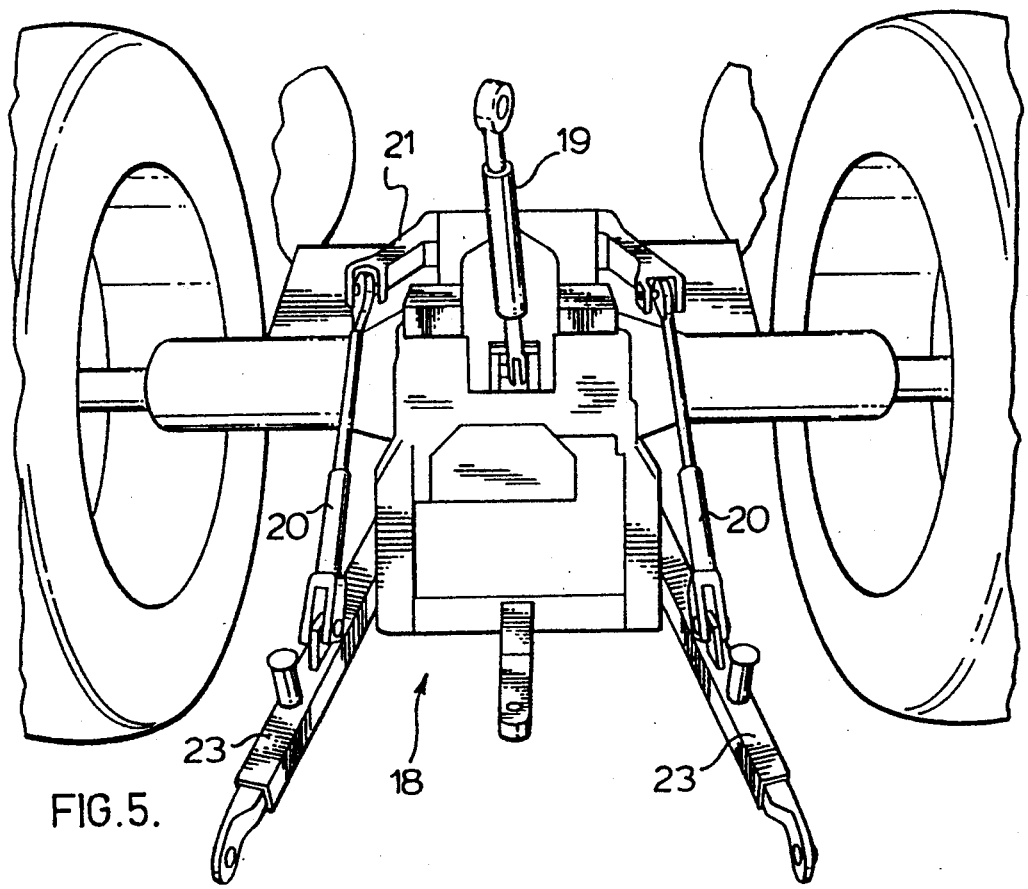
FIG. 5 is a rear perspective view of a conventional three point hitch arranged on the back of a compact tractor.

Referring now to FIG. 5 of the drawings, there is depicted a conventional three point hitch 18 comprising a centre link 19 connected at one end to a compact tractor (a tractor having 40 hp or less), as viewed from the rear thereof. A rock shaft 21 is hingedly connected to lift links 20, which are in turn hingedly connected at opposite ends thereof, in third class lever relation, to pivoting draft arms 23. Such a three point hitch is advantageously operable in combination with scarifier, and scarifier blade attachments according to the present invention. Further positioning control and operational flexibility can be realized, however, through the use in the abovementioned combinations of a modified three point hitch, such as that illustrated in FIG. 5a of the appended drawings.

Figure 5A:
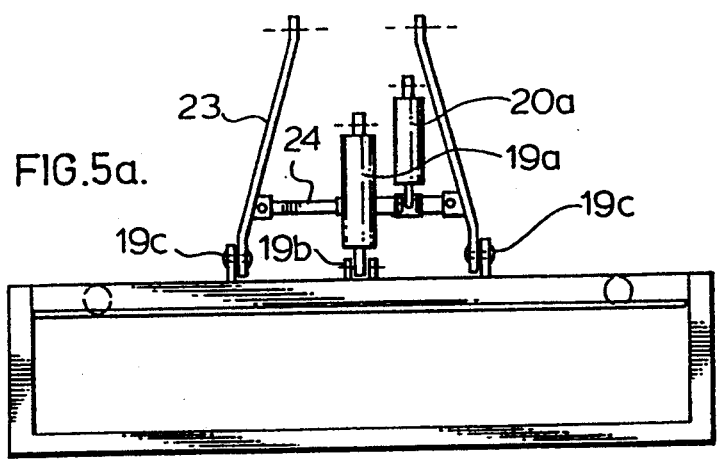
FIG. 5a is a top plan view of the combination scarifier/blade attachment shown in FIG. 1, in combination with attached portions of a modified three point hitch according to the present invention.
Figure 5B:
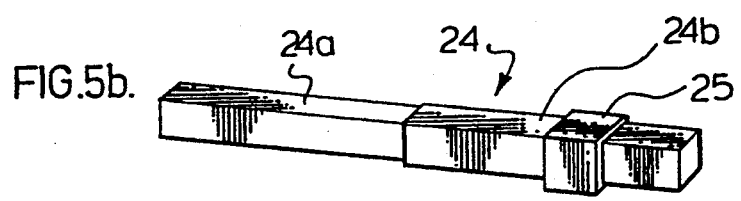
FIG. 5b is a view of the telescopically positionable interconnecting shaft that extends between the two draft links of an especially preferred modified three point hitch in accordance with one aspect of the present invention.

Referring in that connection to FIG. 5a, there is illustrated a modified three point hitch wherein an at least one lift link comprises a selectively operable hydraulic cylinder 20a connected to a corresponding at least on draft link 23. Preferably, the modified three point hinge comprises a telescoping interconnecting shaft 24 that extends between the two draft arms 23. Such a shaft is illustrated in detail in FIG. 5b, and includes a first shaft 24a that is received in slidable telescoping relation within a second shaft 24b. This facilitates adjustment of draft arm spacing, as may be required to facilitate attachment of the present device to a wide range of tractors. In addition, shaft 24 includes a slidably positionable sleeve onto which one end of cylinder 20a is secured. This arrangement permits the apparatus to be readily set up so that the radius of hydraulic lift link 20a matches the operating radius of the other lift link 20. Once the sleeve is so positioned, it is fixedly secured to the shaft 24, prior to pressing the apparatus into service. In the illustrated combination, centre link 19a provides control over the pitch of the attachment, which can be used to co-vary the relative vertical positioning of the scarifier teeth tips relative to the blade tip. Hydraulic lift link 20a is operable to vary the side to side pitch of the attachment, which is useful in producing surface contours such as crowns on roadways, or the like.

Referring now to the drawings in general, there is illustrated an attachment in accordance with the present invention, which comprises, in combination, a modified three point hitch, a scarifier and a plough, which is operatively connected to a suitable vehicle, such as the earlier mentioned compact tractor. In operation, the scarifier teeth 2 are positioned relative to the blade tip 15, to result in simultaneous and controlled scarification depth, and loosened aggregate levelling operations. This is facilitated through the selective retraction and extension of cylinders 12a and 12b.

Side to side pitch of the apparatus is varied through the selective extension and retraction of hydraulic lift link 20a, while the height of the apparatus is controlled in conventional manner by the selective positioning of the rock shaft 21. Draft and contour controls of known type, co-operable with the rock shaft positioning, can also be utilized in this combination.

The angle of attack of the working surfaces of the apparatus can be selectively varied through extension and retraction of hydraulic centre link 19a.

As the tractor is driven along, the attitude of the apparatus is readily adjustable through the selective operations of the rock shaft 21, the centre link 19a, the lift link 20a, and the cylinders 12a and 12b, with the end result that the attachment provides for highly adaptive and versatile surface treatment.

I claim:

1. A scarifier comprising a plurality of supported, downwardly depending, axially secured scarifying teeth having substantial lateral free play at respective scarifying tip ends thereof:

wherein said scarifier includes a scarifying-tooth supporting frame having bracket means adapted to engage respective shank portions of a downwardly depending plurality of scarifying teeth in axially secured relation wherein said teeth have scarifying points at ends of respective ones of said teeth; and wherein said teeth and bracket means include interconnecting pivot pin means and said teeth are rotatable in a laterally extending plane, relative to said bracket, and within the limits of an arc of rotation set by pivot-arc-limiting blocks positioned on said bracket in mutually laterally spaced relation from respective ones of opposed sides of said shank portions.

2. The scarifier according to claim 1 wherein said blocks are operable to limit the degrees of arc through which each of said teeth is rotatable about said pivot pin, to about five degrees to either side from a central position.

3. The scarifier according to claim 2 wherein a plurality of mutually longitudinally spaced apart holes are arranged in each of said shanks to adjustably space said scarifying points from said bracket means.

4. A scarifier/grading device comprising in combination:

a scarifier frame including a plurality of scarifying teeth borne thereon;

a grading blade having a mold board and a cutting edge; and, a second frame interconnecting said scarifier frame and said blade in horizontally, mutually spaced apart relation with said scarifier in forwardly leading relation and said blade in trailing relation;

wherein said scarifier includes height-adjusting means for selectively raising and lowering said plurality of scarifying teeth relative to said cutting edge, and, wherein said teeth are mounted on an angled bracket means for engaging respective shank portions of said plurality of scarifying teeth; said bracket means further angling said teeth at a forward attack angle of between 5 and 15 degrees from vertical; and wherein said plurality of supported, downwardly depending, axially secured scarifying teeth are mounted to said scarifier frame by a means for allowing substantial lateral free play at respective scarifying tip ends thereof.

5. The device according to claim 4 wherein said forward attack angle is about 10 degrees from vertical.

6. The device according to claim 4 wherein said teeth and bracket means include a plurality of teeth pivot pin means for interconnecting shank portions of each of said teeth and said bracket means and to permit said teeth to rotate in a laterally extending plane relative to said bracket means and within the limits of an arc of rotation set by pivot-arc-limiting blocks positioned on said bracket means in mutually laterally spaced relation from respective ones of opposed sides of said shank portions.

7. The scarifier according to claim 6 wherein said bracket means comprises a laterally extending, elongated, teeth pivot supporting bar for supporting each of said tooth pivot pin means, each said pivot pin means engaging corresponding ones of a plurality of said teeth in rotatable relation about said tooth pivot pins, through respective pivot holes extending through respective shank portions of each of said teeth, said pivot-arc-limiting blocks arranged in mutually laterally spaced apart relation to either side of each of said tooth pivot pin means with said teeth being adapted to be positioned generally centrally between respective ones of said pairs.

8. The scarifier according to claim 7 wherein said blocks are operable to limit the degrees of arc through which said teeth is rotatable about said pivot pin, to about five degrees to either side from a central position.

9. The scarifier according to claim 8 wherein a plurality of mutually longitudinally spaced apart holes are arranged in each of said shank portions to adjustably space said scarifying points from said pivot.

* * * * *